US011076687B2

(12) United States Patent
Blewett et al.

(10) Patent No.: US 11,076,687 B2
(45) Date of Patent: Aug. 3, 2021

(54) MODULAR CARTS HAVING A SINGLE VERTICAL FRAME

(71) Applicant: INOVATIV, INC., Irwindale, CA (US)

(72) Inventors: Patrick Timothy Blewett, Altadena, CA (US); Matthew Richard Benich, Montclair, CA (US); Brent John Siebenaler, Rimforest, CA (US)

(73) Assignee: Inovativ, Inc., Irwindale, CA (US)

( * ) Notice: Subject to any disclaimer, the term of this patent is extended or adjusted under 35 U.S.C. 154(b) by 0 days.

(21) Appl. No.: 16/567,405

(22) Filed: Sep. 11, 2019

(65) Prior Publication Data

US 2021/0068532 A1 Mar. 11, 2021

(51) Int. Cl.
| | |
|---|---|
| *B62B 3/00* | (2006.01) |
| *A47B 9/20* | (2006.01) |
| *B62B 3/12* | (2006.01) |
| *B62B 3/02* | (2006.01) |
| *A47B 21/02* | (2006.01) |
| *A47B 81/06* | (2006.01) |
| *A47B 21/04* | (2006.01) |

(52) U.S. Cl.
CPC ............... *A47B 9/20* (2013.01); *B62B 3/02* (2013.01); *B62B 3/12* (2013.01); *A47B 21/02* (2013.01); *A47B 21/04* (2013.01); *A47B 81/064* (2013.01); *B62B 2202/56* (2013.01)

(58) Field of Classification Search
CPC .. A47B 9/20; A47B 21/04; B62B 3/02; B62B 3/12
See application file for complete search history.

(56) References Cited

U.S. PATENT DOCUMENTS

| | | | | |
|---|---|---|---|---|
| 4,570,887 A | * | 2/1986 | Banister | F16M 11/041 248/187.1 |
| 4,767,090 A | * | 8/1988 | Hartman | F16M 11/16 24/273 |
| 4,832,294 A | * | 5/1989 | Eidem | A61M 5/1415 248/125.8 |
| 5,288,093 A | * | 2/1994 | Gross | A61G 5/10 248/230.6 |

(Continued)

OTHER PUBLICATIONS

Backstage Equipment, Inc.; Equipment handling carts for the Film and Television Industry; Backstage Catalog 2018, 3rd edition.

(Continued)

*Primary Examiner* — Hau V Phan
(74) *Attorney, Agent, or Firm* — Lynch LLP

(57) ABSTRACT

This application describes carts having a single vertical frame supported by a tripod-like leg structure. They are collapsible, extendable, and able to accommodate a wide variety of different accessories. To add accessories, carts can include one or more coupling components. Each coupling component includes at least one clamp that can be tightened around a cart's vertical frame along with a female coupler and a male coupler. The female coupler can be attached to a clamp and a male coupler can be attached to an accessory. The male coupler features a v-shaped extrusion and the female coupler features a complementary v-shaped intrusion allowing the male coupler to couple with the female coupler so that accessories can be added to the cart in a cantilevered manner.

10 Claims, 4 Drawing Sheets

(56) References Cited

U.S. PATENT DOCUMENTS

| | | | | |
|---|---|---|---|---|
| 5,618,055 A * | 4/1997 | Mulholland | ............ | A61G 5/14 |
| | | | | 180/907 |
| 5,918,841 A * | 7/1999 | Sweere | ................ | A47B 21/00 |
| | | | | 248/123.11 |
| 5,931,440 A * | 8/1999 | Miller | ...................... | B60R 1/04 |
| | | | | 248/549 |
| 6,109,461 A | 8/2000 | Kluge | | |
| 6,203,053 B1 * | 3/2001 | Sohrt | ....................... | A61H 3/04 |
| | | | | 248/129 |
| 6,481,679 B1 * | 11/2002 | Bennett | ............... | A61G 13/101 |
| | | | | 248/223.41 |
| 8,474,832 B2 * | 7/2013 | Mersky | ............... | F16M 11/105 |
| | | | | 280/33.992 |
| 8,567,809 B2 * | 10/2013 | White | ................... | B62B 3/027 |
| | | | | 280/651 |
| 9,016,213 B2 * | 4/2015 | Tajbakhsh | ............. | A47B 21/00 |
| | | | | 108/103 |
| 9,180,897 B2 | 11/2015 | Boivin | | |
| 2004/0195789 A1 * | 10/2004 | Christensen | ......... | F16M 11/245 |
| | | | | 280/35 |
| 2005/0127017 A1 | 6/2005 | Kessel | | |
| 2012/0104200 A1 | 5/2012 | Grady | | |
| 2012/0286075 A1 * | 11/2012 | Brueske | ................ | B05B 15/628 |
| | | | | 239/722 |
| 2013/0154213 A1 * | 6/2013 | Marquez-Molina | ..... | A45C 3/00 |
| | | | | 280/35 |
| 2013/0307237 A1 * | 11/2013 | Chen | .................... | A61G 12/001 |
| | | | | 280/35 |
| 2016/0235490 A1 * | 8/2016 | Srivastava | ............. | A61B 46/10 |

OTHER PUBLICATIONS

Backstage Equipment, Inc.; Equipment handling carts for the Film and Television Industry; Backstage Catalog 2018, 3rd edition, Monitor Mover Cart, p. 79.

Backstage Equipment, Inc.; Equipment handling carts for the Film and Television Industry; Backstage Catalog 2018, 3rd edition, Magliner Carts & Accessories, Mag Stead-Cam Stand, p. 98.

* cited by examiner

MODULAR CARTS HAVING A SINGLE VERTICAL FRAME

This application claims priority to U.S. patent application Ser. No. 16/566,867 titled "V-Shaped Coupling System" filed Sep. 10, 2019.

FIELD OF THE INVENTION

The field of the invention is modular carts.

BACKGROUND

The background description includes information that may be useful in understanding the present invention. It is not an admission that any of the information provided in this application is prior art or relevant to the presently claimed invention, or that any publication specifically or implicitly referenced is prior art.

Carts are used in a wide variety of industries, including in film and television. Typical carts include four wheels with a framed structure that creates flat space to set or mount equipment. But it can be desirable to have a cart that has only a single, vertical frame component that is supported by three wheels. When a cart is made to include a single vertical frame from which all the cart's accessories are mounted, new solutions are required to improve stability and ease-of-use.

For example, new coupling mechanisms are needed to make it easier to attach and detach different accessories. Because accessories (e.g., shelves and trays) that are added to a cart having a vertical frame must all couple to that vertical frame, new devices to facilitate that coupling are needed. There is still a need for improved carts having a single vertical frame, especially improvements that make it easier to add or remove accessories.

SUMMARY OF THE INVENTION

The present invention provides apparatuses, systems, and methods directed to modular carts. In one aspect of the inventive subject matter, a cart is contemplated comprising: a frame; a first leg, a second leg, and a third leg, each coupled with the frame; a coupling mechanism comprising a clamp that is configured to couple with the frame; a female coupler attached to the clamp, the female coupler comprising a v-shaped intrusion; and a male coupler comprising a v-shaped extrusion that is sized and dimensioned to fit at least partially within the v-shaped intrusion of the female coupler.

In some embodiments, the frame is telescopic to adjust its length. Each of the legs can additionally include a wheel or caster that improves the cart's mobility. In some embodiments, the clamp is configured to tighten around at least a portion of the frame so that it remains in place by friction forces, thus providing a stable base that accessories can be attached to in a cantilevered manner. Some embodiments can include a second claim that is also coupled with the female coupler. In some embodiments, a shelf can be attached to a male coupler so that the shelf can be added to the cart.

Female couplers of the inventive subject matter can additionally include a flared opening to the v-shaped intrusion to make it easier for male couplers to be connected to female couplers. In some embodiments, the female coupler further comprises: a through-hole in a top portion of the female coupler, where a pin is disposed in the through hole and the pin can be actuated to cause it to move relative to the female coupler and where the pin is actuated to be disposed at least partially in a complementary cavity in the male coupler to hold the male coupler in place when it is coupled with the female coupler.

In some embodiments, the first leg is further coupled with the frame by a first arm and the second leg is further coupled with the frame by a second arm, which makes it possible for a cart to further include a tray having a first elongated hook and a second elongated hook where the first elongated hook hangs over the first arm and the second elongated hook hangs over the second arm to support the tray.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
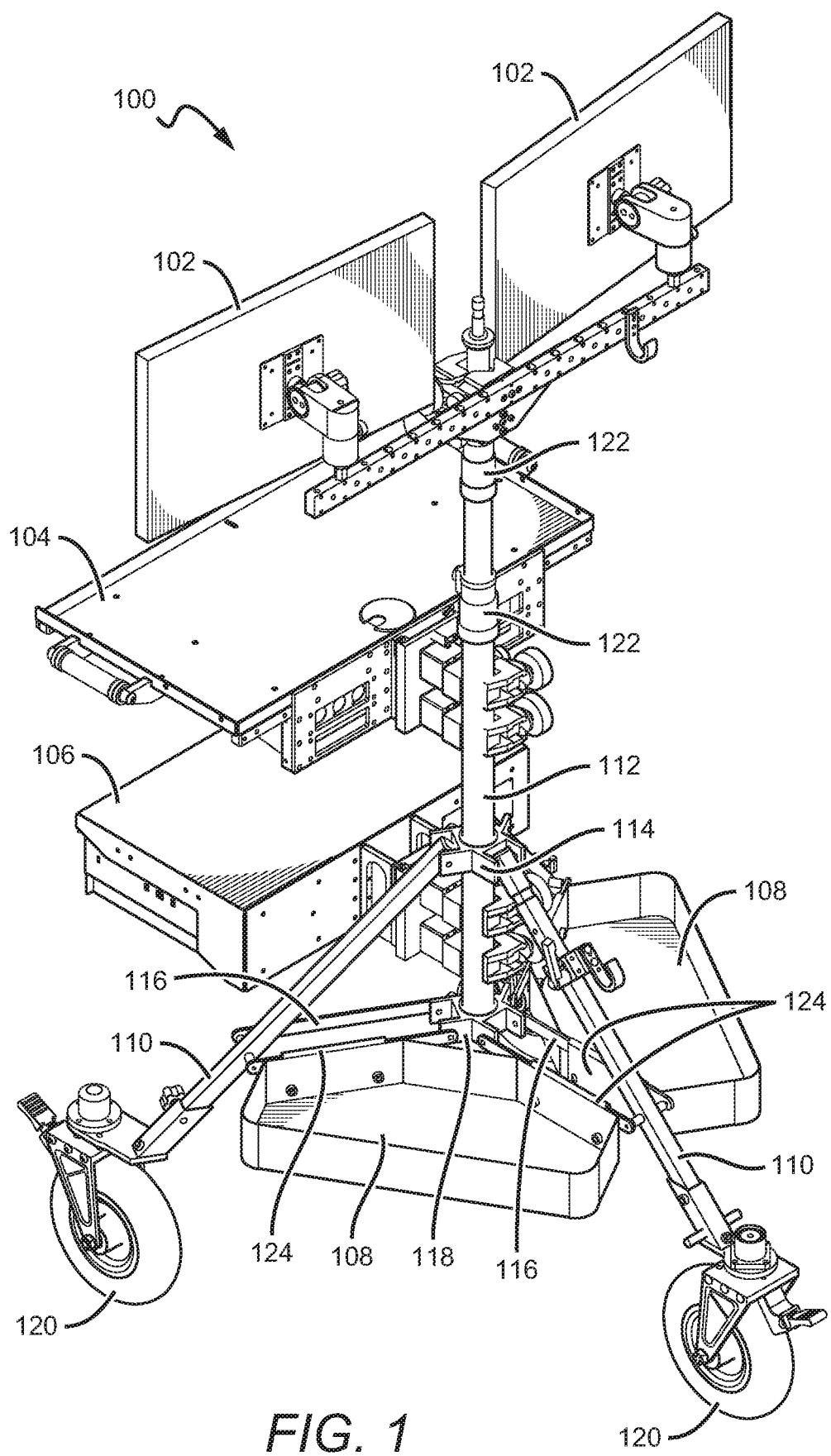
FIG. 1 is a cart of the inventive subject matter.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

Carts of the inventive subject matter are design to be modular, collapsible, and to feature a single frame (e.g., typically a vertical frame) for accessories to couple with. Thus, carts include three legs that can have wheels (e.g., free-rotating wheels, casters, etc.), where the three legs couple with a frame by mechanisms that allow the legs to collapse so that they are near or against the frame upon collapsing. Carts of the inventive subject matter additionally include one or more coupling mechanisms that are configured to attach to the frame to facilitate quick coupling and decoupling of cantilevered accessories.

FIG. 1 shows an embodiment of a cart 100 of the inventive subject matter. The cart 100 includes accessories such as monitors 102, a first shelf 104, a second shelf 106, and two trays 108. The cart 100 is supported by three legs 110 (two of which are visible in FIG. 1), and the legs couple with the frame 112 via mechanisms that allow the legs 110 to collapse toward the frame 112 to make storing and transporting the cart 100 easier.

Each leg 110 couples with a bracket 114 that is in turn coupled with the frame 112. The bracket 114 is configured to slide along a length of the frame 112 and can include a locking mechanism that holds the bracket 114 in place relative to the frame 112 upon actuating the locking mechanism. When the locking mechanism is actuated to hold the bracket 114 in place, the legs 110 are held in place as a result. Each leg is also coupled with a lower bracket 118 at a bottom portion of the frame 112 by a corresponding arm 116. Each arm 116 is rotatably coupled (e.g., by a pin joint allowing for one-degree-of-freedom rotation) with a leg 110 and with a lower bracket 118. The lower bracket 118 is typically fixed at a bottom portion of the frame 112, and when the bracket 114 slides away from the lower bracket 118, the legs 110 are brought closer to the frame 112 until they are parallel (or substantially parallel) with the frame 112. The bracket 114 can also be used to adjust how large the cart's footprint is. For example, when the bracket 114 is closer to the lower bracket 118, the legs will be far apart creating a more stable base but also a larger footprint, and vice versa. Legs 110 can also include wheels 120, which can make it easier to move or otherwise reposition the cart 100.

The frame 112 can have several other useful features. For example, in some embodiments, as shown in FIG. 1, the frame is telescopic, allowing its height to be adjusted using quick release mechanisms 122. Quick release mechanisms 122 can be tightened so that the frame maintains a desired height, or they can be loosened to adjust that height.

Figure 3:
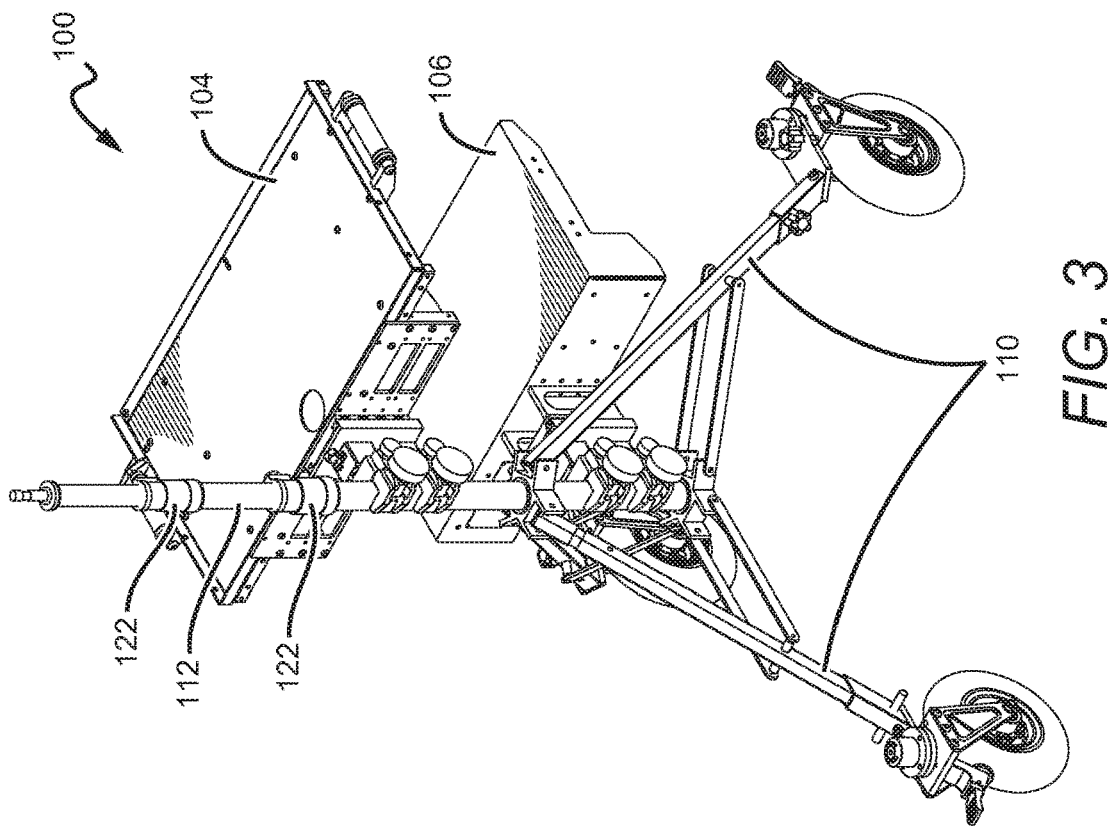
FIG. 3 shows the cart of FIG. 2 from a different angle.
Figure 2:
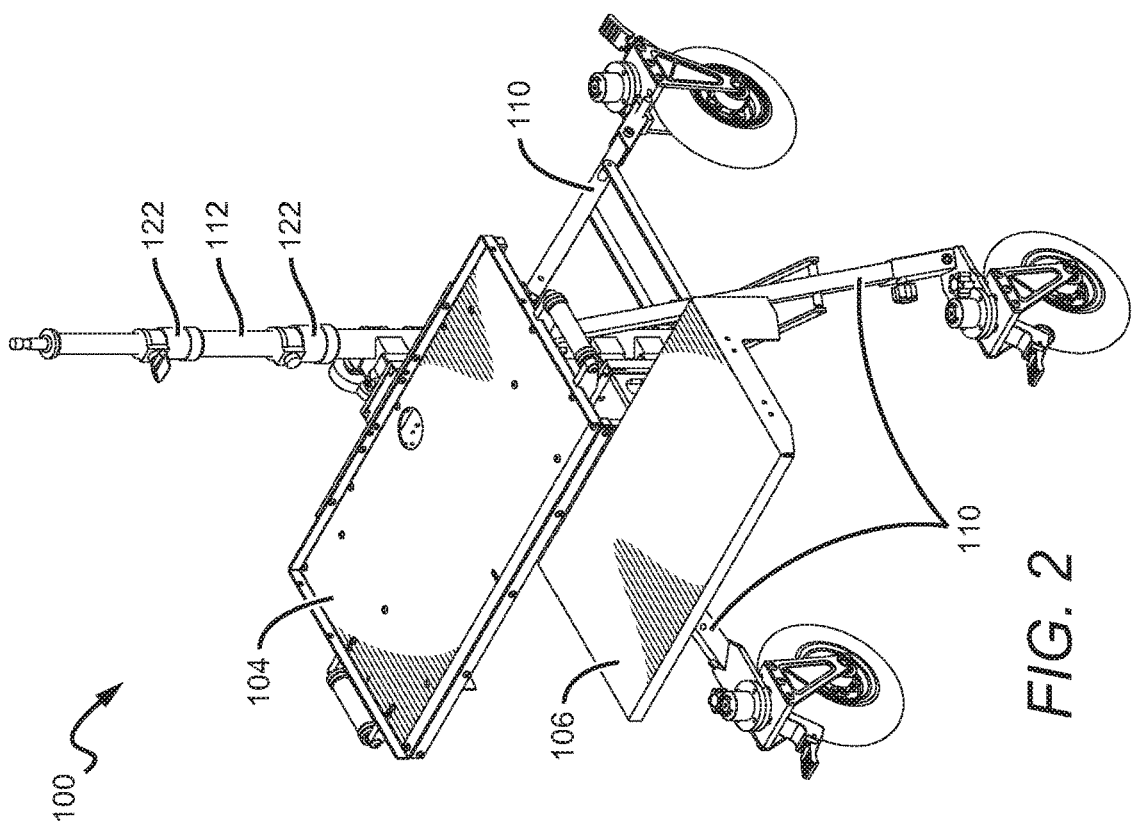
FIG. 2 is the cart of FIG. 1 without any monitors.

When the frame 112 is in a desired configuration (e.g., by tightening the quick releases 122 after adjusting the frame's height), additional components can be added to the frame 112. FIGS. 2 and 3, which show the cart 100 of FIG. 1 without the monitors 102 on top, show two shelves 104 and 106 coupled with the frame 112 in a cantilevered fashion. Shelves 104 and 106 are coupled with the frame 112 by coupling mechanisms that are designed to both grip the frame 112 and to facilitate quickly attaching and detaching different accessories by simply dropping the accessory into place.

In addition to accessories that can couple with a cart of the inventive subject matter using a coupling component that attaches to a cart's frame, other accessories can also be coupled with the arms that help provide stability to the legs of a cart. FIG. 1 shows two trays 108 that hang from at least two arms 116 each. To hang on the arms 116, tray 108 includes at least two elongated hooks 124 to hold the tray onto two arms 116. This way, a tray can be set down so that the two elongated hooks 124 hold the tray 108 up, creating easy-to-access storage near the bottom of the cart 100.

Figure 4:
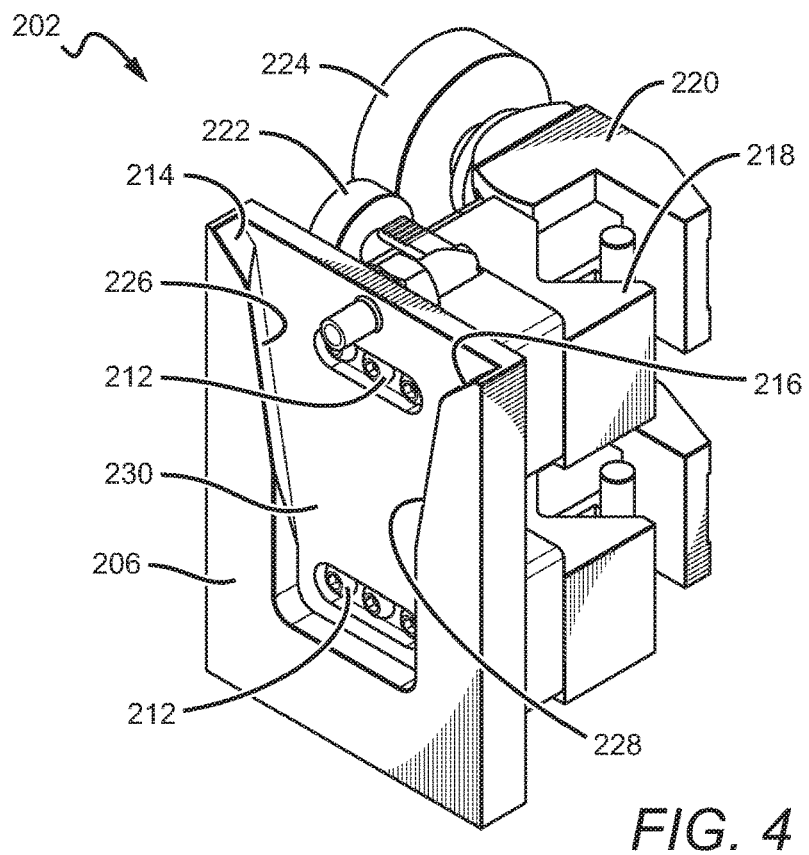
FIG. 4 shows a female coupler with attached clamps.
Figure 5:
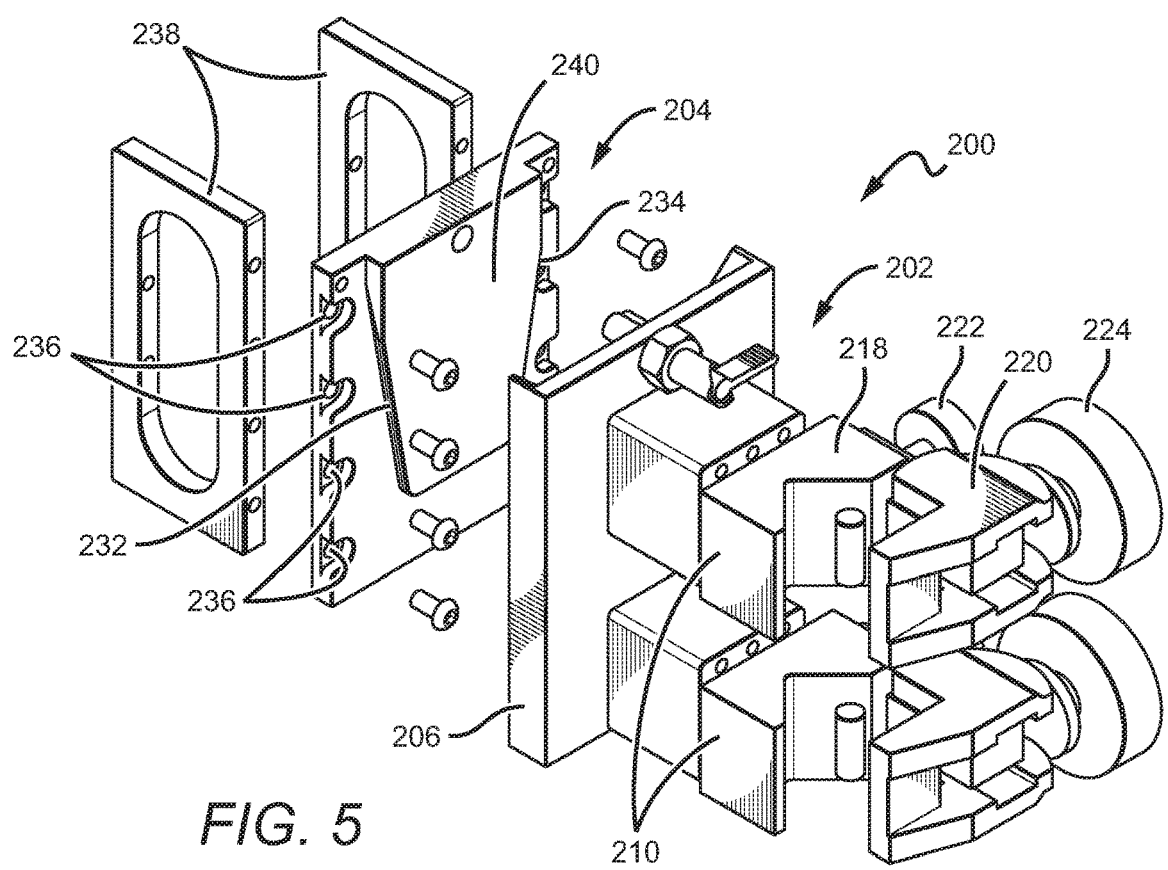
FIG. 5 shows the female coupler of FIG. 4 with an associated male coupler.

A clamping side 202 of a coupling component 200 is shown in FIG. 4, and an exploded view showing both the clamping side 202 and the coupling side 204 is shown in FIG. 5. The clamping side comprises a female coupler 206 and the coupling side 204 comprises a male coupler 208. The clamping side 202 is additionally shown with two clamps 210, though in some embodiments only a single clamp is needed.

The female coupler 206 can have two clamps 210 coupled or affixed to it. A clamp of the inventive subject matter includes a first grip 218, a second grip 220, a first tightening mechanism 222, and a second tightening mechanism 224. Each clamp is configured to couple with, e.g., a frame (e.g., a vertical support structure, as described above). Tightening mechanisms enable a user to ensure the clamps are tightly coupled with the frame so that the coupling mechanism 200 cannot slide downward or otherwise experience unwanted movements. Tightening mechanisms can be turned to cause the space within the clamps to become smaller. Thus, when a clamp is on a frame and it is tightened, the clamp grips onto the frame so that the clamp is held in place relative to the frame. Two clamps 210 can be included to improve stability, e.g., when an accessory is coupled with a coupling mechanism that is in turn coupled to a frame. Because accessories (e.g., shelves, computer keyboard trays, etc.), when coupled to a frame via a coupling mechanism of the inventive subject matter, are cantilevered, it is advantageous to ensure stability of the coupled accessory.

Clamps 210 can be coupled with the female coupler 206 using screws 212 as shown in FIG. 4. The top row of screws 212 fasten the top portion of the female coupler 206 to the top clamp, while the bottom row of screw 212 fasten the bottom portion of the female coupler 206 to the bottom clamp. In some embodiments, the female coupler 206 can be made from the same stock of material as at least the portions of the clamps 210 that couple with the female coupler (e.g., by casting or machining the part).

As seen in FIG. 4, the female coupler 206 comprises a v-shaped intrusion with an opening at the top that is wider than the intrusion is at the bottom. Moreover, the opening at the top of the intrusion includes a left flare 214 and a right flare 216. The flares 214 and 216 are angled outwardly to make the opening at the top of the intrusion wider than it would be if the intrusion followed its angled coupling edges 226 and 228 to the top of the female coupler 206. This makes it easier for the male coupler 208 to be mated successfully with the female coupler 206, since the male coupler's extrusion is narrower at the bottom than at the top.

The angled coupling edges 226 and 228 are both formed so that material coming from the back surface 230 of the female coupler 206 creates an acute angle between the angled coupling edges 226 and 228 and the back surface 230. This causes the male coupler 208, when coupled with the female coupler 206, to be held securely in place by its matching v-shaped extrusion. Angling of the female coupler's intrusion can be seen in, e.g., FIG. 3, which shows the left flare 214 with an angled surface connecting down to the back surface 230. The right side is a mirror image of the left side. Thus, flares 214 and 216 feature beveling that the extruded portion of the male coupler 208 fits into.

Female coupler 206 additionally includes a portion below the v-shaped portion that has two parallel walls extending downward from the angled coupling edges 226 and 228. These parallel walls extend downward to a bottom edge, creating a space that, upon coupling the male coupler 208 with the female coupler 206, need not be unoccupied by the male coupler's complementary extrusion. In some embodiments, this space exists so that the bottom screws among the set of screws are lower down on the female coupler 206 and can attach a second clamp to the female coupler 206. This improves the ability of the male and female coupler to hold a cantilevered accessory by making a connection between the female coupler and the clamps stronger and by facilitating the use of more than one clamp. In some embodiments, only one clamp is needed, and thus the bottom row of through holes remain unused.

The male coupler 208, as shown in FIG. 4, features a v-shaped extrusion that is complementary to the v-shaped intrusion on the female coupler 206. The female coupler's intrusion thus receives the male coupler's extrusion to couple the two components to one another. To fit the male coupler 208 into the female coupler 206, the male coupler slides into the female coupler such that the wide end of the female intrusion receives the narrow end of the male extrusion. By forming the male and female couplers into complementary "V" shapes, it is thus easier to fit the extruded portion of the male coupler into the intruded portion of the female coupler to create a support for an accessory like a shelf or tray.

The male coupler 208 is visible in FIG. 5, which shows the v-shaped extrusion 240 on the male coupler 208. Both the left side of the extrusion 232 and the right side of the extrusion 234 are similarly angled so that the extrusion can fit within the complementary intrusion on the female coupler 206. Thus, the intrusion on the female coupler 206 and extrusion on the male coupler 208 are formed into "V" shapes so that it is easier for the male coupler 208 to be mated with the female coupler 206.

Figure 6:
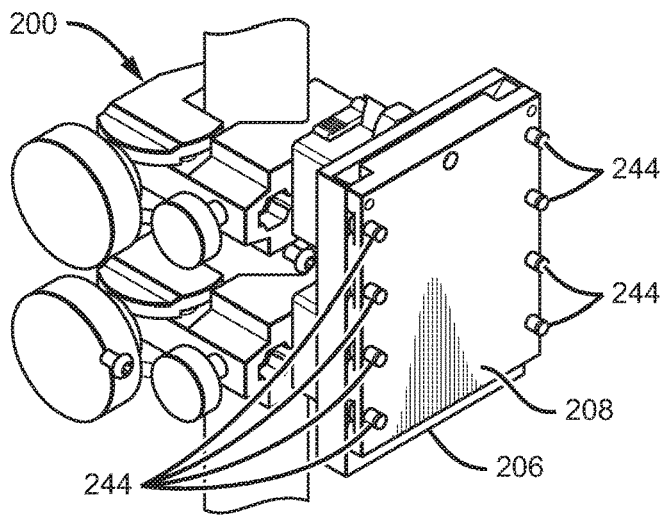
FIG. 6 shows a female coupler attached to a frame with a male coupler attached to the female coupler.

The female and male couplers 206 & 208 mated with one another is shown in FIG. 6. For the two couplers to mate, the male coupler 208 is slid downward so that the male extrusion fits into the female intrusion, where the female intrusion's wide opening facilitates ease-of-use. The coupling component 200 is shown coupled with a frame 242, where the two clamps 210 are tightened around the frame 242 so that the coupling component 200 cannot move or rotate relative to the frame 242. The back side of the male coupler 208 is visible, showing the array of through holes 236 with screws 244 protruding therethrough.

Like the female coupler's intrusion, the male coupler's extrusion is flared outward along the angled edges. The surfaces created by the outwardly flared edges interact with the surfaces created by the complementary flared surfaces of the female intrusion, creating a coupling between the male and female coupler when the male coupler is slid into place such that the male coupler's extrusion fits into the female coupler's extrusion.

As seen in FIG. 6, the male coupler 208 can include eight through holes that can have screws 244 pass through them to facilitate fastening accessories to the male coupler 208. Through holes 236 are also shown in FIG. 5 with reference numerals only shown on the side of the male coupler 208 where the through holes 236 are visible—the other side of the male coupler 208 being a mirror image thereof. These through holes 236 can accommodate screws 244 (as shown in FIG. 6) or other fasteners so that accessories having matching through holes (e.g., threaded or otherwise) can be fastened to the male coupler 208. When an accessory has a male coupler fastened thereto, it can quickly and easily be coupled with (or decoupled from) a complementary female coupler, allowing accessories to easily be added to or removed from a cart of the inventive subject matter.

While the embodiment shown in the FIG. 5 features brackets 238 that fasten to the male coupler 208, any other type of accessory that includes, e.g., threaded holes for screws to tighten into after passing through the through holes 236 can additionally or alternatively be coupled with the male coupler 208. For example, accessories such as the shelves and trays shown in FIGS. 1-3 are coupled with a male coupler so that they can be coupled via the male coupler to a female coupler that is in turn coupled with a cart's frame. Carts of the inventive subject matter can include several different accessories, where the number of attached accessories is limited by the length of cart's vertical frame as well as the amount of free space available on the frame. For example, FIGS. 1-3 show a cart with two accessories cantilevered from the frame (FIGS. 2 and 3 omit the monitors shown in FIG. 1).

Figure 7:
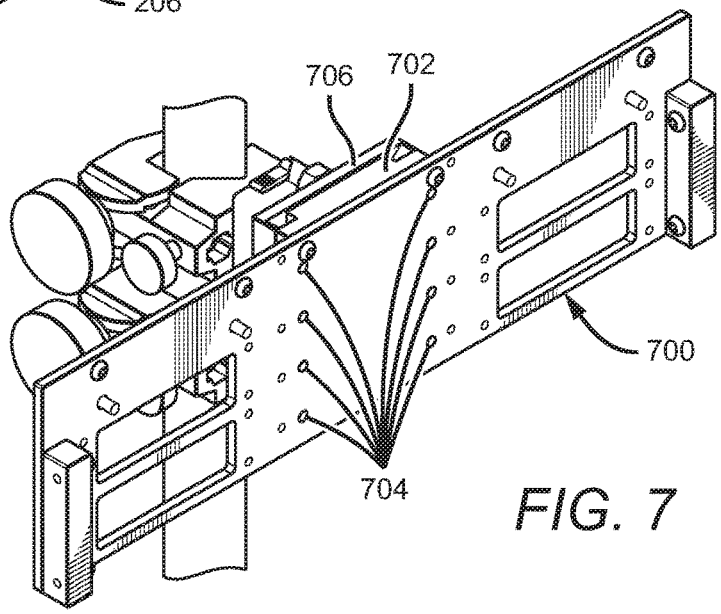
FIG. 7 shows an accessory affixed to a male coupler that is coupled with a female coupler and attached to a frame.

As described above, accessories can be fastened to the male coupler. FIG. 7 shows a back plate 700 from such an accessory that is fastened to the male coupler. The back plate 700 is fastened to a male coupler 702 by screws that pass through the male coupler's through holes and tighten into threaded holes 704 on the back plate 700. The male coupler 702 can then couple with the female coupler 706 by sliding the male coupler's extrusion into a complementary intrusion on the female coupler 706.

Figure 8:
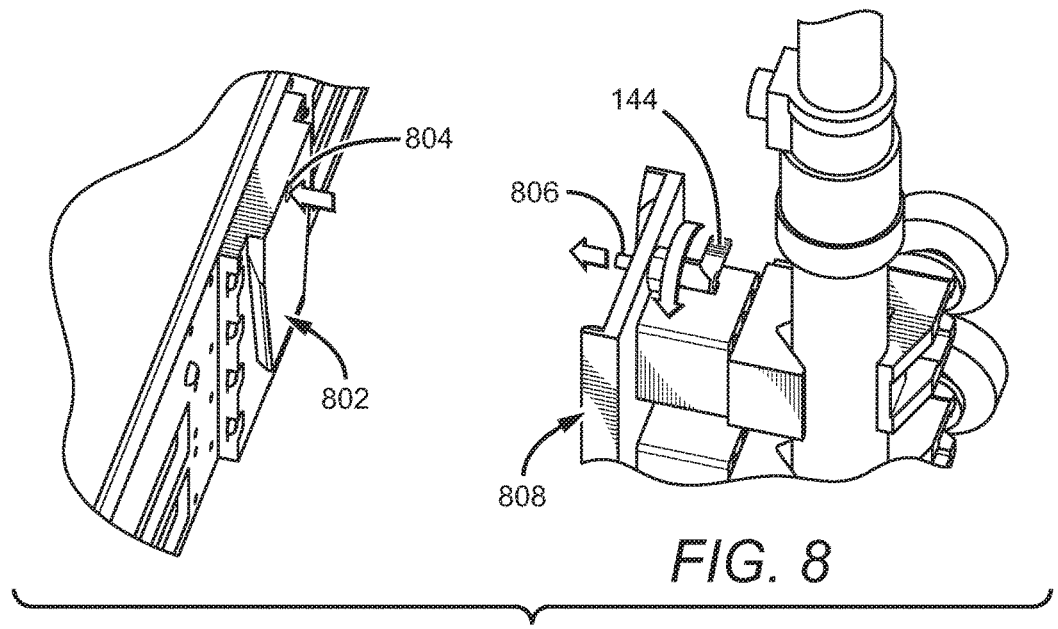
FIG. 8 shows a locking mechanism.

FIG. 8 shows a locking mechanism that can be included in some embodiments. As shown throughout the figures, the male coupler 802 includes a hole 804. Hole 804 can be a through-hole as shown in the figures, but this is not a requirement for all embodiments. Hole 804 is sized and dimensioned to receive a pin 806. The locking mechanism includes the pin 806 that protrudes through the female coupler 808 as well as a component 810 on the other side of the female coupler that can be interacted with the manipulate the pin 806.

In the embodiment shown in FIG. 8, turning the component 810 according to the curved arrow causes the pin 806 to move inward or outward (depending on direction of rotation) from the hole in which it resides within the female coupler 808. Thus, the component 810 is turned one direction to fully retract the pin 806 so that the male coupler 802 can be mated to the female coupler 808. Once the male coupler 802 is in place relative to the female coupler (e.g., as shown in FIGS. 1 and 2), the component 810 can again be rotated so that the pin 806 extrudes into the hole 804 in the male coupler 802. This prevents accidental decoupling of the male coupler 802 from the female coupler 808.

In some embodiments, pin 806 can be spring loaded. In these embodiments, pulling on component 810 compresses a spring while retracting the pin 806. When component 810 is released, the pin 806 is then pushed by the spring back into an extruded position such that the pin 806 can reside within hole 804 on the male coupler 802, thus preventing accidentally decoupling the male coupler 802 from the female coupler 808.

Thus, specific modular carts of the inventive subject matter have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A cart, comprising:
    a frame;
    a first leg, a second leg, and a third leg, each coupled with a bracket that is slidably coupled with the frame;
    a coupling mechanism comprising a clamp that is configured to couple with the frame;
    wherein the clamp comprises a first grip having a first tightening mechanism and a second grip having a second tightening mechanism;
    a female coupler attached to the clamp, the female coupler comprising a v-shaped intrusion, wherein the v-shaped intrusion comprises a first portion, a second portion, and a back surface;
    wherein the first portion comprises a first left surface and a first right surface extending from the back surface, the first left surface and the first right surface creating a first angle therebetween;
    wherein the second portion comprises a left flare and a right flare extending from the back surface, the left flare and the right flare creating a second angle therebetween;
    wherein the second angle is greater than the first angle;
    wherein the first left surface and the first right surface each form an acute angle with the back surface;
    wherein the left flare and the right flare each form a right, or obtuse, angle with the back surface;
    a male coupler comprising a v-shaped extrusion that is sized and dimensioned to fit at least partially within the v-shaped intrusion of the female coupler; and
    wherein the v-shaped extrusion comprises a third angle that matches the first angle of the v-shaped intrusion.

2. The cart of claim 1, wherein the frame is telescopic to adjust its length.

3. The cart of claim 1, wherein the first leg comprises a first wheel, the second leg comprises a second wheel, and the third leg comprises a third wheel.

4. The cart of claim 1, wherein the clamp is configured to tighten around at least a portion of the frame so that it remains in place by friction forces.

5. The cart of claim 1, wherein a shelf is attached to the male coupler.

6. The cart of claim 1, wherein the female coupler further comprises a flared opening to the v-shaped intrusion.

7. The cart of claim 1, wherein the female coupler further comprises:
    a through-hole in a top portion of the female coupler;
    wherein a pin is disposed in the through hole and the pin can be actuated to cause it to move relative to the female coupler; and
    wherein the pin is actuated to be disposed at least partially in a complementary cavity in the male coupler to hold the male coupler in place when it is coupled with the female coupler.

8. The cart of claim 1, wherein the first leg is further coupled with the frame by a first arm and the second leg is further coupled with the frame by a second arm.

9. The cart of claim 8, further comprising a triangular tray having a first elongated hook and a second elongated hook, wherein the first elongated hook hangs over the first arm and the second elongated hook hangs over the second arm such that the triangular tray is suspended between the first arm and the second arm.

10. The cart of claim 1, wherein the frame is vertically oriented.

* * * * *